(12) United States Patent
Cho et al.

(10) Patent No.: US 7,920,887 B2
(45) Date of Patent: Apr. 5, 2011

(54) SYSTEM AND METHOD FOR SETTING UP P2P COMMUNICATION GROUP IN CELLULAR SYSTEM, AND P2P COMMUNICATION SYSTEM AND METHOD USING P2P COMMUNICATION GROUP

(75) Inventors: Dong Ho Cho, Daejeon (KR); Ho Won Lee, Daejeon (KR); Woong Sup Lee, Daejeon (KR); O Hyun Jo, Daejeon (KR); Ji Hyun Park, Daejeon (KR)

(73) Assignee: Korean Advanced Institute of Science and Technology, Daejeon (KR)

( * ) Notice: Subject to any disclaimer, the term of this patent is extended or adjusted under 35 U.S.C. 154(b) by 846 days.

(21) Appl. No.: 11/973,878

(22) Filed: Oct. 9, 2007

(65) Prior Publication Data

US 2009/0023460 A1    Jan. 22, 2009

Related U.S. Application Data

(63) Continuation-in-part of application No. PCT/KR2007/004847, filed on Oct. 4, 2007.

(30) Foreign Application Priority Data

Jul. 20, 2007  (KR) .................. 10-2007-0072590

(51) Int. Cl.
*H04B 7/00* (2006.01)
*H04B 7/14* (2006.01)
*H04M 3/493* (2006.01)
*H04W 4/00* (2009.01)
*H04W 36/00* (2009.01)
*H04W 24/00* (2009.01)

(52) U.S. Cl. ..... 455/518; 455/517; 455/519; 455/414.2; 455/433; 455/440; 455/456.1; 455/16

(58) Field of Classification Search ................. 455/517, 455/518, 519, 414.2, 433, 440, 456.1, 16
See application file for complete search history.

(56) References Cited

U.S. PATENT DOCUMENTS

| | | | |
|---|---|---|---|
| 6,681,115 B1 * | 1/2004 | McKenna et al. | 455/517 |
| 7,346,361 B2 * | 3/2008 | Kang et al. | 455/458 |
| 7,509,131 B2 * | 3/2009 | Krumm et al. | 455/456.1 |
| 7,738,898 B2 * | 6/2010 | Aaron | 455/519 |
| 2003/0013456 A1 * | 1/2003 | Bates et al. | 455/456 |
| 2004/0116073 A1 * | 6/2004 | Mauney et al. | 455/41.2 |
| 2006/0040693 A1 * | 2/2006 | Yoon et al. | 455/519 |
| 2006/0105795 A1 * | 5/2006 | Cermak et al. | 455/518 |
| 2008/0280637 A1 * | 11/2008 | Shaffer et al. | 455/519 |

* cited by examiner

*Primary Examiner* — Matthew D Anderson
*Assistant Examiner* — Bobbak Safaipour
(74) *Attorney, Agent, or Firm* — Kevin D. Jablonski; Graybeal Jackson LLP

(57) ABSTRACT

Disclosed herein are a system and method for setting up a Peer-to-Peer (P2P) communication group in a cellular system, and a P2P communication system and method using the P2P communication group. The system for setting up a P2P communication group for a terminal in a cellular system including a base station and the terminals includes a location detection unit, a location information transmission unit, a control information reception unit, and a final group setup unit. The location detection unit detects the location of a terminal. The location information transmission unit sends information about the location, detected by the location detection unit, to the base station. The control information reception unit receives information about a preliminary P2P communication group set up by the base station based on the location information. The final group setup unit sets up a final P2P communication group based on the preliminary P2P communication group.

4 Claims, 8 Drawing Sheets

SYSTEM AND METHOD FOR SETTING UP P2P COMMUNICATION GROUP IN CELLULAR SYSTEM, AND P2P COMMUNICATION SYSTEM AND METHOD USING P2P COMMUNICATION GROUP

CROSS-REFERENCE TO RELATED APPLICATION

This is a continuation application that claims benefit, under 35 USC §120, of co-pending International Application PCT/KR2007/004847, filed 4 Oct. 2007, designating the United States, and that claims foreign priority benefits under 35 USC §119(a) to Korean Patent Application No. 2007-0072590 filed 20 Jul. 2007, both of which are incorporated herein by reference.

TECHNICAL FIELD

The present invention relates, in general, to Peer-to-Peer (P2P) communication technology in a cellular system and, more particularly, to a method of grouping target P2P terminals, located within an area in which P2P communication is possible, around a P2P communication terminal in a cellular system, and a P2P communication method using the P2P communication group.

BACKGROUND

Generally, for inter-terminal P2P communication in a wireless Local Area Network (LAN) system or an ad-hoc system, terminals capable of P2P communication are detected through a broadcasting process without a separate grouping process.

That is, a P2P communication terminal, desiring P2P communication, broadcasts a communication request message to check whether P2P communication is possible. Adjacent target P2P terminals, having received the communication request message from the P2P communication terminal, check whether P2P communication with the P2P communication terminal is possible, and send a communication possible message to the P2P communication terminal. Then P2P communication is enabled between the P2P communication terminal and the target P2P terminals.

Meanwhile, in a current cellular system, only communication between a base station and terminals is performed, but P2P communication between the terminals is not performed. Information about the allocation of data exchanged between the base station and the terminals is made known via control information within a MAC frame, and a user checks the control information, and receives data from the base station or and sends data to the base station. Accordingly, in the cellular system, it can be seen that the base station manages all of the data transmission in the system.

When a P2P communication terminal searches for target P2P terminals through broadcasting, as in the wireless LAN system or an ad-hoc system, in the case where such a cellular system supports P2P communication, problems arise in that the power consumption of terminals and interference in the system increase, thereby degrading the overall performance of the system.

Meanwhile, in a current cellular system, no separate MAC frame for P2P communication is defined, and thus a base station must manage P2P communication using an existing MAC frame. In this case, problems arise in that the overhead of the base station is increased and the performance of the system is degraded due to the exchange of P2P management messages between the base station and the terminals.

TECHNICAL PROBLEM

Accordingly, the present invention has been made keeping in mind the above problems occurring in the prior art, and an object of the present invention is to provide a system and method for setting up a P2P communication group, which groups terminals available for P2P communication into a P2P communication.

Another object of the present invention is to provide a system and method for performing P2P communication between terminals using a P2P communication group and a P2P frame.

SUMMARY

In order to accomplish the above objects, the present invention provides a system for setting up a P2P communication group for a terminal in a cellular system including a base station and the terminals, including a location detection unit for detecting a location of a terminal; a location information transmission unit for sending information about the location, detected by the location detection unit, to the base station; a control information reception unit for receiving information about a preliminary P2P communication group set up by the base station based on the location information; and a final group setup unit for setting up a final P2P communication group based on the preliminary P2P communication group.

In addition, the present invention provides a system for setting up a P2P communication group for a base station in a cellular system including the base station and terminals, including a location information reception unit for receiving location information from the terminals located within a cell; a P2P communication management unit for setting up a preliminary P2P communication group and selecting a P2P communication terminal of the preliminary P2P communication group based on the location information of the terminals received from the location information reception unit; and a control information transmission unit for sending information about the preliminary P2P communication group and information about the P2P communication terminal to the terminals that belong to the preliminary P2P communication group.

In addition, the present invention provides a system for setting up a P2P communication group in a cellular system including a base station and terminals, each of the terminals includes a location detection unit for detecting a location of a terminal, a location information transmission unit for sending information about the location, detected by the location detection unit, to the base station, a control information reception unit for receiving information about a preliminary P2P communication group set up by the base station based on the location information, and a final group setup unit for setting up a final P2P communication group based on the preliminary P2P communication group; the final group setup unit includes a group setup signal transmission unit for sending a broadcast signal to target P2P terminals that belong to the preliminary P2P communication group, a group setup signal reception unit for receiving a feedback signal regarding the broadcast signal from the target P2P terminals, a signal measurement unit for detecting channel information and a service type of the feedback signal, and a P2P communication management unit for setting up a final P2P communication group based on the information about the preliminary P2P communication group and the information obtained by the signal measurement unit; and the base station includes a location information reception unit for receiving location information from the terminals located within a cell, a P2P communication management unit for setting up a preliminary P2P communication group and selecting a P2P communication terminal of the preliminary P2P communication group based on the location information of the terminals, received from the location information reception unit, and a control information transmission unit for sending information about the preliminary P2P communication group and information about the P2P communication terminal to the terminals that belong to the preliminary P2P communication group.

In addition, the present invention provides a method of setting up a P2P communication group for a terminal in a cellular system including a base station and terminals, including a location detection step of detecting a location of a terminal; a location information transmission step of sending information about the location, detected at the location detection step, to the base station; a control information reception step of receiving information about a preliminary P2P communication group set up by the base station based on the location information; and a final group setup step of setting up a final P2P communication group based on the preliminary P2P communication group.

In addition, the present invention provides a method of setting up a P2P communication group for a base station in a cellular system including the base station and terminals, including a location information reception step of receiving location information from the terminals located within a cell; a P2P communication management step of setting up a preliminary P2P communication group and selecting a P2P communication terminal of the preliminary P2P communication group based on the location information of the terminals received at the location information reception step; and a control information transmission step of sending information about the preliminary P2P communication group and information about the P2P communication terminal to the terminals that belong to the preliminary P2P communication group.

In addition, the present invention provides a method of setting up a P2P communication group in a cellular system including a base station and terminals, wherein each of the terminals includes a location detection step of detecting a location of a terminal, a location information transmission step of sending information about the location, detected at the location detection step, to the base station, a control information reception step of receiving information about a preliminary P2P communication group set up by the base station based on the location information, and a final group setup step of setting up a final P2P communication group based on the preliminary P2P communication group; the final group setup step includes a group setup signal transmission step of sending a broadcast signal to target P2P terminals that belong to the preliminary P2P communication group, a group setup signal reception step of receiving a feedback signal regarding the broadcast signal from the target P2P terminals, a signal measurement step of detecting channel information and a service type of the feedback signal, and a P2P communication management step of setting up a final P2P communication group based on the information about the preliminary P2P communication group and the information obtained at the signal measurement step; and the base station includes a location information reception step of receiving location information from the terminals located within a cell, a P2P communication management step of setting up a preliminary P2P communication group and selecting a P2P communication terminal of the preliminary P2P communication group based on the location information of the terminals received at the location information reception step, and a control information transmission step of sending information about the preliminary P2P communication group and information about the P2P communication terminal to the terminals that belong to the preliminary P2P communication group.

In addition, the present invention provides a P2P communication system for a terminal using a P2P communication group in a cellular system including a base station and terminals, including a location detection unit for detecting a location of a terminal; a location information transmission unit for sending information about the location, detected by the location detection unit, to the base station; a control information reception unit for receiving information about a preliminary P2P communication group and information about a P2P frame for P2P communication from the base station; a final group setup unit for setting up a final P2P communication group based on the preliminary P2P communication group; and a P2P communication unit for performing P2P communication with another terminal that belongs to the final P2P communication group.

In addition, the present invention provides a P2P communication system for a base station using a P2P communication group in a cellular system including the base station and terminals, including a location information reception unit for receiving location information from terminals located within a cell; a P2P-related information collection unit for collecting information about frequency and characteristics of P2P communication within the cell and in adjacent cells; a P2P communication management unit for setting up a preliminary P2P communication group and selecting a P2P communication terminal of the preliminary P2P communication group based on the location information of the terminals received from the location information reception unit, and creating a P2P frame based on the information about the frequency and characteristics of P2P communication received from the P2P-related information collection unit; and a control information transmission unit for sending information about the preliminary P2P communication group, the P2P communication terminal and the P2P frame to the terminals that belong to the preliminary P2P communication group.

In addition, the present invention provides a P2P communication system using a P2P communication group in a cellular system including a base station and terminals, wherein each of the terminals includes a location detection unit for detecting a location of a terminal, a location information transmission unit for sending information about the location, detected by the location detection unit, to the base station, a control information reception unit for receiving information about a preliminary P2P communication group and information about a P2P frame for P2P communication from the base station, a final group setup unit for setting up a final P2P communication group based on the preliminary P2P communication group, and a P2P communication unit for performing P2P communication with another terminal that belongs to the final P2P communication group; the final group setup unit includes a group setup signal transmission unit for sending a broadcast signal to target P2P terminals that belong to the preliminary P2P communication group, a group setup signal reception unit for receiving a feedback signal for the broadcast signal from the target P2P terminals, a signal measurement unit for detecting channel information and a service type of the feedback signal, and a P2P communication management unit for setting up a final P2P communication group based on the information about the preliminary P2P communication group and the information obtained by the signal measurement unit; and the base station includes a location information reception unit for receiving location information from terminals located within a cell, a P2P-related information collection unit for collecting information about frequency and characteristics of P2P communication within the cell and in adjacent cells, a P2P communication management unit for setting up a preliminary P2P communication group and selecting a P2P communication terminal of the preliminary P2P communication group based on the location information of the terminals received from the location information reception unit and creating a P2P frame based on the information about the frequency and characteristics of P2P communication received from the P2P-related information collection unit, and a control information transmission unit for sending information about the preliminary P2P communication group, the P2P communication terminal and the P2P frame to the terminals that belong to the preliminary P2P communication group.

In addition, the present invention provides a P2P communication method for a terminal using a P2P communication group in a cellular system including a base station and terminals, including a location detection step of detecting a location of a terminal; a location information transmission step of sending information about the location, detected at the location detection step, to the base station; a control information reception step of receiving information about a preliminary P2P communication group and information about a P2P frame for P2P communication from the base station; a final group setup step of setting up a final P2P communication group based on the preliminary P2P communication group; and a P2P communication step of performing P2P communication with another terminal that belongs to the final P2P communication group.

In addition, the present invention provides a P2P communication method for a base station using a P2P communication group in a cellular system including the base station and terminals, including a location information reception step of receiving location information from terminals located within a cell; a P2P-related information collection step of collecting information about frequency and characteristics of P2P communication within the cell and in adjacent cells; a P2P communication management step of setting up a preliminary P2P communication group and selecting a P2P communication terminal of the preliminary P2P communication group based on the location information of the terminals received at the location information reception step, and creating a P2P frame based on the information about the frequency and characteristics of P2P communication received at the P2P-related information collection step; and a control information transmission step of sending information about the preliminary P2P communication group, the P2P communication terminal and the P2P frame to the terminals that belong to the preliminary P2P communication group.

In addition, the present invention provides a P2P communication method using a P2P communication group in a cellular system including a base station and terminals, wherein each of the terminals includes a location detection step of detecting a location of a terminal, a location information transmission step of sending information about the location, detected at the location detection step, to the base station, a control information reception step of receiving information about a preliminary P2P communication group and information about a P2P frame for P2P communication from the base station, a final group setup step of setting up a final P2P communication group based on the preliminary P2P communication group, and a P2P communication step of performing P2P communication with another terminal that belongs to the final P2P communication group; the final group setup step includes a group setup signal transmission step of sending a broadcast signal to target P2P terminals that belong to the preliminary P2P communication group, a group setup signal reception step of receiving a feedback signal for the broadcast signal from the target P2P terminals, a signal measurement step of detecting channel information and a service type of the feedback signal, and a P2P communication management step of setting up a final P2P communication group based on the information about the preliminary P2P communication group and the information obtained at the signal measurement step; and the base station includes a location information reception step of receiving location information from terminals located within a cell, a P2P-related information collection step of collecting information about frequency and characteristics of P2P communication within the cell and in adjacent cells, a P2P communication management step of setting up a preliminary P2P communication group and selecting a P2P communication terminal of the preliminary P2P communication group based on the location information of the terminals received at the location information reception step, and creating a P2P frame based on the information about the frequency and characteristics of P2P communication received at the P2P-related information collection step, and a control information transmission step of sending information about the preliminary P2P communication group, the P2P communication terminal and the P2P frame to the terminals that belong to the preliminary P2P communication group.

ADVANTAGEOUS EFFECTS

According to the present invention, broadcast signals and feedback signals are transmitted and received only between the terminals of a P2P communication group set up based on location information, so that the power consumption of the terminal and interference within a system can be minimized, thereby improving the performance of the system.

Furthermore, a plurality of final P2P communication groups is simultaneously set up by a plurality of P2P communication terminals within a plurality of preliminary P2P communication groups, so that the time required for the setup of P2P communication groups can be reduced, the failure rate of P2P communication can be reduced, and the control overhead of a base station can be reduced because the terminals perform group management.

Moreover, a P2P frame is added to a MAC frame, and the location and size of the P2P frame are adjusted depending on the states of adjacent cells and the frequency of P2P communication within a corresponding cell, so that P2P communication between the terminals can be supported and resources can be efficiently used.

DESCRIPTION OF DRAWINGS

The above and other objects, features and other advantages of the present invention will be more clearly understood from the following detailed description taken in conjunction with the accompanying drawings, in which.

DETAILED DESCRIPTION

A system and method for setting up a P2P communication group and a system and method for performing communication using the P2P communication group according to embodiments of the present invention will be described below with reference to the accompanying drawings.

In order to achieve P2P communication between terminals in a mobile communication system, a P2P communication terminal must have information about a target P2P terminal that can perform P2P communication with it. Based on the P2P communication terminal, a set of the P2P communication terminal and target P2P terminals available for P2P communication is defined as a P2P communication group.

The base station sets up a preliminary P2P communication group based on the location information of the terminals, and sends information about the preliminary P2P communication group to the P2P communication terminal and the target P2P terminals that belong to the preliminary P2P communication group. Then, the P2P communication terminal sends a broadcast signal to the target P2P terminals that belong to the preliminary P2P communication group, while the target P2P terminals wait for the broadcast signal sent from the P2P communication terminal. The P2P communication terminal sends a broadcast signal to the target P2P terminals, receives information about a channel state and a service type based on the broadcast signal fed back from the target P2P terminals, sets up a final P2P communication group, and notifies the base station of the information.

Figure 1:
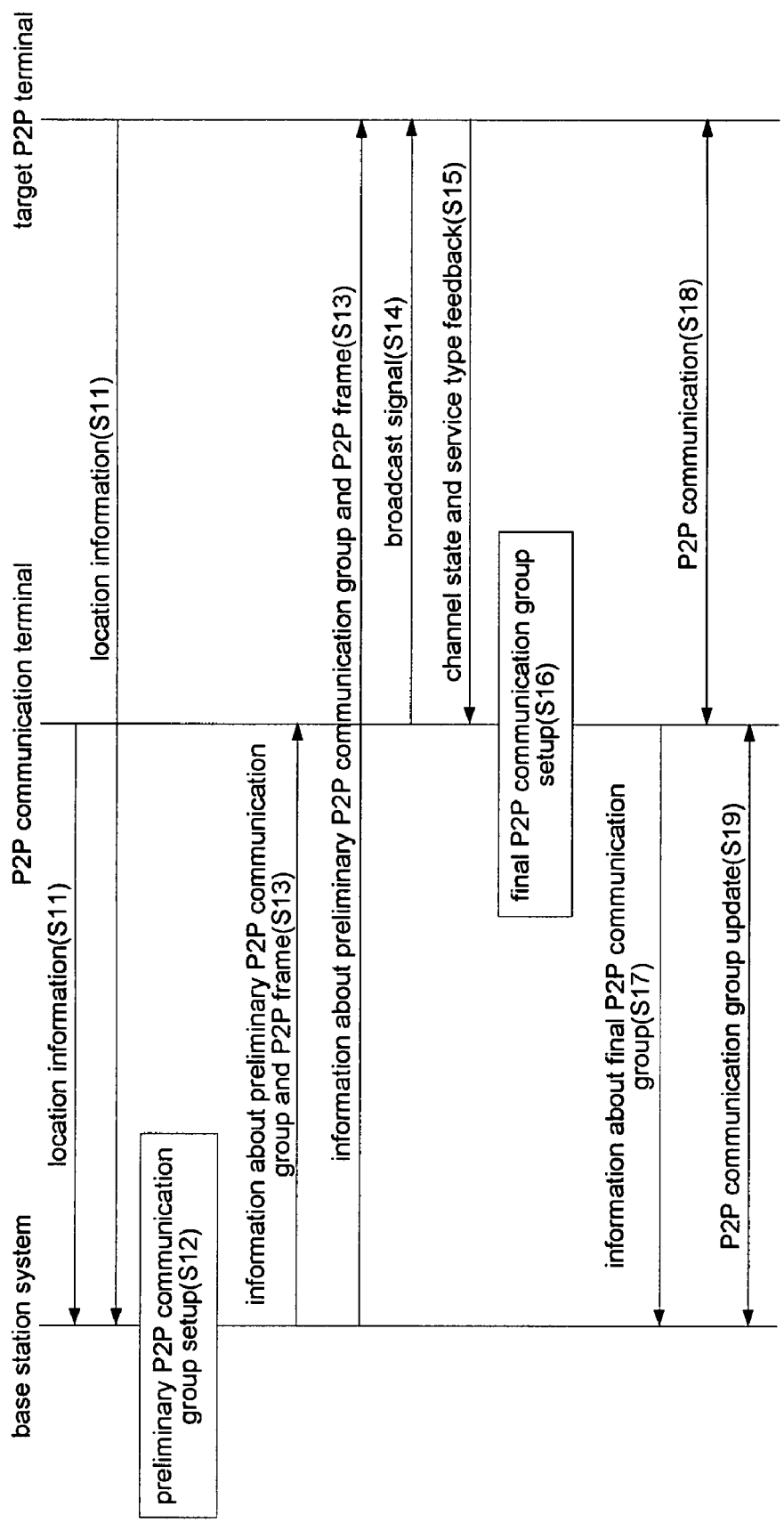
FIG. 1 is a diagram schematically showing a process of P2P communication in a cellular system according to the present invention.

FIG. 1 is a diagram schematically showing a process of P2P communication in a cellular system according to the present invention.

Generally, the cellular system includes a base station and a plurality of terminals. Each P2P communication group includes a P2P communication terminal and target P2P terminals. The P2P communication terminal is selected by the base station so as to prevent interference between P2P communication terminals. That is, the base station sets up a plurality of preliminary P2P communication groups, selects the P2P communication terminals of the preliminary P2P communication groups in such a way as to prevent interference between P2P communication terminals, and allows respective P2P communication terminals to set up final P2P communication groups at the same time.

First, all of the terminals (the P2P communication terminal and the target P2P terminals) send the location information thereof to the base station at step S11, and the base station selects a preliminary P2P communication group within which P2P communication between terminals is possible and a P2P communication terminal based on the location information of the terminals at step S12. The base station sends information about the preliminary P2P communication group and information about a P2P frame for P2P communication to the P2P communication terminal and the target P2P terminals at step S13.

Then, the P2P communication terminal sends a broadcast signal to the target P2P terminals at step S14, and the target P2P terminal feeds back information about the channel state and service type based on the broadcast signal at step S15. The P2P communication terminal sets up a final P2P communication group based on the channel state and the service type based on the broadcast signal at step S16, and sends information about the final P2P communication group to the base station at step S17.

In a state in which the final P2P communication group has been set up, the P2P communication terminal and the target P2P terminals can perform P2P communication using the P2P frame at step S18. When P2P communication between the terminals is possible, the P2P communication terminal can communicate with the base station through P2P communication with a target P2P terminal in the case where the P2P communication terminal has insufficient power.

If there is a change in the final P2P communication group (the entry or exit of a terminal), the base station updates the P2P communication group through communication with the P2P communication terminals that belong to the P2P communication group at step S19.

Figure 2:
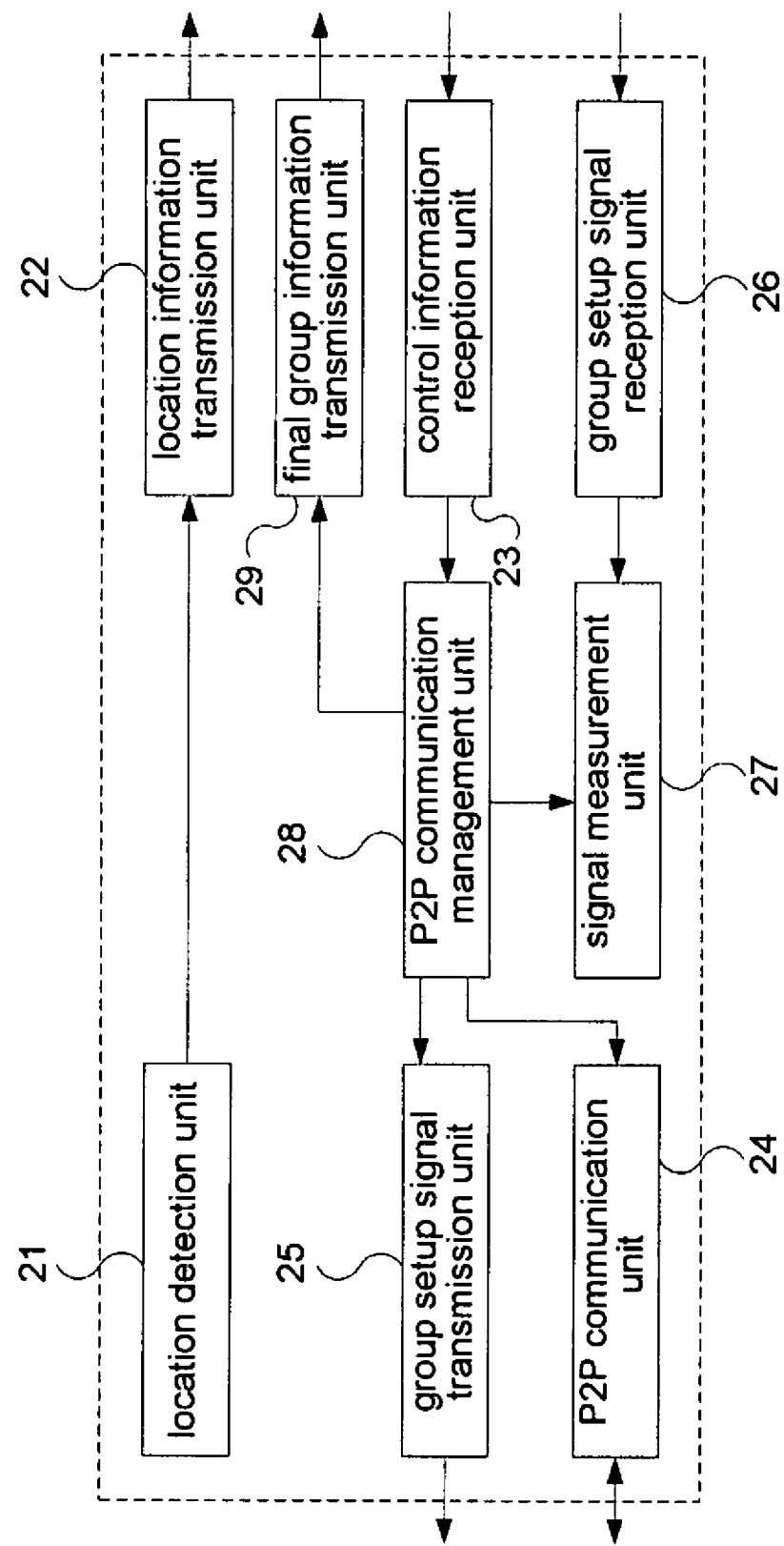
FIG. 2 is a diagram showing the internal construction of a terminal for performing P2P communication between terminals in a cellular system according to an embodiment of the present invention.

FIG. 2 is a diagram showing the internal construction of a terminal for performing P2P communication between terminals in a cellular system according to an embodiment.

Each of the terminals includes a location detection unit 21 for detecting the location of a terminal, a location information transmission unit 22 for sending information about the location, detected by the location detection unit 21, to the base station, a control information reception unit 23 for receiving information about a preliminary P2P communication group and information about a P2P frame for P2P communication from the base station, a final group setup unit for setting up a final P2P communication group based on the preliminary P2P communication group, and a P2P communication unit 24 for performing P2P communication with another terminal that belongs to the final P2P communication group.

The final group setup unit includes a group setup signal transmission unit 25 for sending a broadcast signal to target P2P terminals that belong to the preliminary P2P communication group, a group setup signal reception unit 26 for receiving a feedback signal regarding the broadcast signal from the target P2P terminals, a signal measurement unit 27 for detecting the channel information (for example, the SINR of a broadcast message) and service type of the feedback signal, and a P2P communication management unit 28 for setting up a final P2P communication group based on the information about the preliminary P2P communication group and the information obtained by the signal measurement unit 27. The final group setup unit further includes a final group information transmission unit 29 for sending information about the final P2P communication group to the base station.

The group setup signal reception unit 26 receives a broadcast signal from another P2P communication terminal and transmits the broadcast signal to the signal measurement unit 27, the signal measurement unit 27 detects the channel information and service type of the received broadcast signal, the P2P communication management unit 28 manages the final P2P communication group based on the received broadcast signal, and the group setup signal transmission unit 25 sends a feedback signal regarding the received broadcast signal.

The location detection unit 21 detects the location thereof using a Global Positioning System (GPS) device, or using one of the location detection methods other than a GPS device.

The base station selects a P2P communication terminal while setting up a preliminary P2P communication group, in which case the P2P communication terminal is selected such that it does not interface with another terminal.

Figure 3:
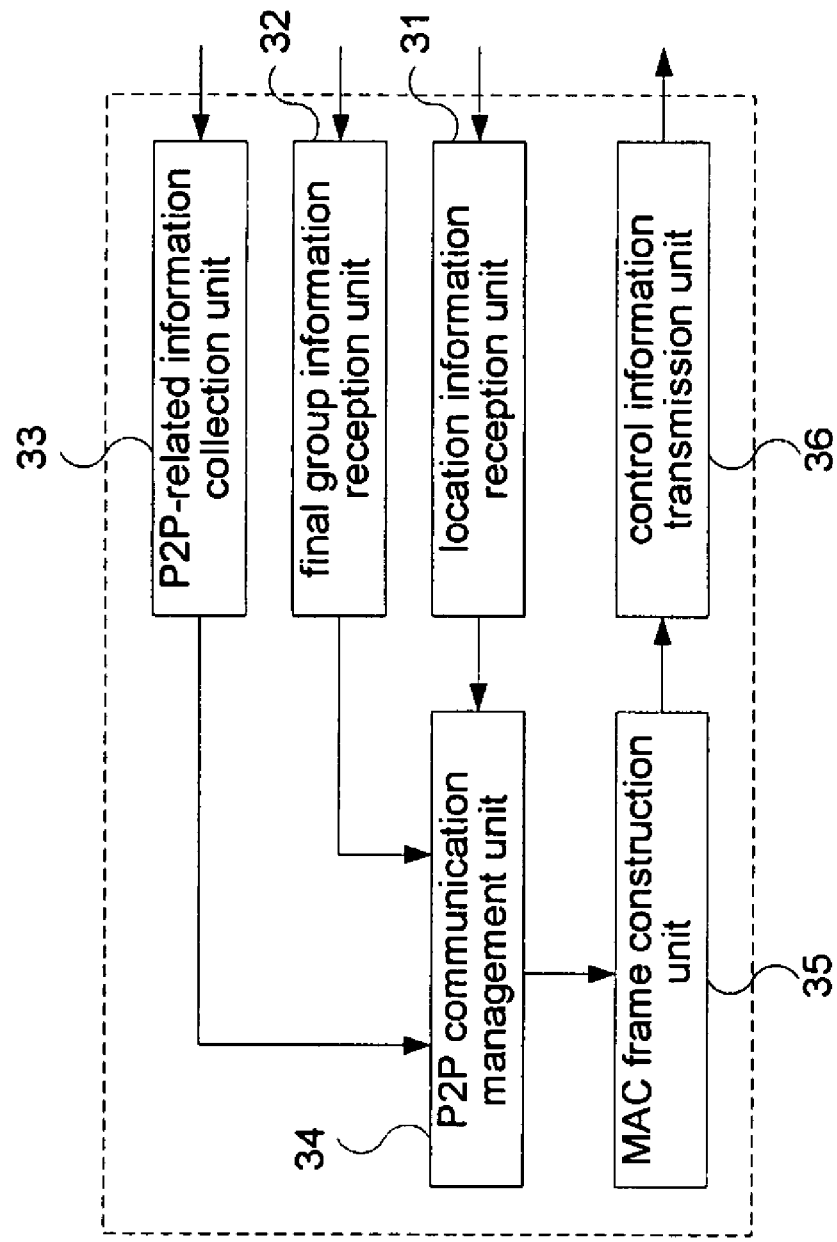
FIG. 3 is a diagram showing the internal construction of a base station for performing P2P communication between terminals in a cellular system according to an embodiment of the present invention.

FIG. 3 is a diagram showing the internal construction of a base station for performing P2P communication between terminals in a cellular system according to an embodiment of the present invention.

The base station includes a location information reception unit 31 for receiving location information from respective terminals located within a cell, a final group information reception unit 32 for receiving information about a final P2P communication group information, a P2P-related information collection unit 33 for collecting information about the frequency and characteristics of P2P communication within the cell and in adjacent cells, a P2P communication management unit 34 for setting up a preliminary P2P communication group and managing a final P2P communication group based on the location information of the terminals received from the location information reception unit 31, and creating a P2P frame based on the information about the frequency and characteristics of P2P communication received from the P2P-related information collection unit 33, a MAC frame construction unit 35 for constructing a MAC frame by combining a control information transmission frame, a downlink frame and an uplink frame with the P2P frame of the P2P communication management unit 34, and a control information transmission unit 36 for sending the MAC frame, including the information about the preliminary P2P communication group and the P2P frame, to the terminals that belong to the preliminary P2P communication group.

The location information reception unit 31 checks whether a terminal exits the final P2P communication group based on the location information of the terminals, and the P2P communication management unit 34 performs group update in response to the exit of the terminal in conjunction with the P2P communication terminals of the corresponding final P2P communication group. Furthermore, the location information reception unit 31 checks whether a terminal enters the final P2P communication group based on the location information of the terminals, and the P2P communication management unit 33 performs group update in response to the entry of the terminal in conjunction with the P2P communication terminals of the final P2P communication group.

The operation of the base station and terminal, constructed as described above, is described below.

The location detection unit 21 of each terminal detects the location thereof, and the location information transmission unit 22 sends location information, detected by the location detection unit 21, to the base station.

The location information reception unit 31 of the base station receives the location information of the terminals and transmits the information to the P2P communication management unit 34, the P2P communication management unit 34 sets up a preliminary P2P communication group within which P2P communication between terminals is possible and selects a P2P communication terminal based on the location information of the terminals, and the control information transmission unit 36 sends information about the preliminary P2P communication group and information about the P2P communication terminal to the P2P communication terminal and target P2P terminals that belong to the preliminary P2P communication group.

Then, the control information reception unit 23 of the P2P communication terminal receives the information about the preliminary P2P communication group, and the group setup signal transmission unit 25 sends a broadcast signal to the target P2P terminals under the control of the P2P communication management unit 28.

Meanwhile, when the information about the preliminary P2P communication group is received, the control information reception unit of each target P2P terminal awaits the reception of a broadcast signal from the P2P communication terminal, and receives a broadcast signal using a group setup signal reception unit when the broadcast signal is received from the P2P communication terminal, and the signal measurement unit 27 measures a channel state and a service type and feeds back information about the channel state and the service type via a group setup signal transmission unit.

The group setup signal reception unit 26 of the P2P communication terminal receives a feedback signal, indicating a channel state and a service type based on the broadcast signal sent by it, from each of the target P2P terminals, and sets up a final P2P communication group, and the final group information transmission unit 29 sends information about the set-up final P2P communication group to the base station.

In the state in which the final P2P communication group has been set up, the P2P communication terminal can perform P2P communication with the target P2P terminals belonging to the final P2P communication group without intervention from the base station.

While the final P2P communication group is set up through the exchange of the broadcast signal and the feedback signal between the P2P communication terminal and the target P2P terminals within the above-described preliminary P2P communication group, a process of setting up a final P2P communication group is also performed in another preliminary P2P communication group. Since the P2P communication terminals of the preliminary P2P communication groups do not interfere with each other, simultaneous broadcasting is possible, and thus the time required for the setup of each final P2P communication group can be reduced.

Of course, in order to perform P2P communication between the P2P communication terminal and the target P2P terminals, a MAC frame must be modified. In the present invention, a P2P frame is added to the MAC frame, and the P2P communication terminal and the target P2P terminals perform P2P communication using the P2P frame. A detailed description of the P2P frame will be given later.

Figure 4:
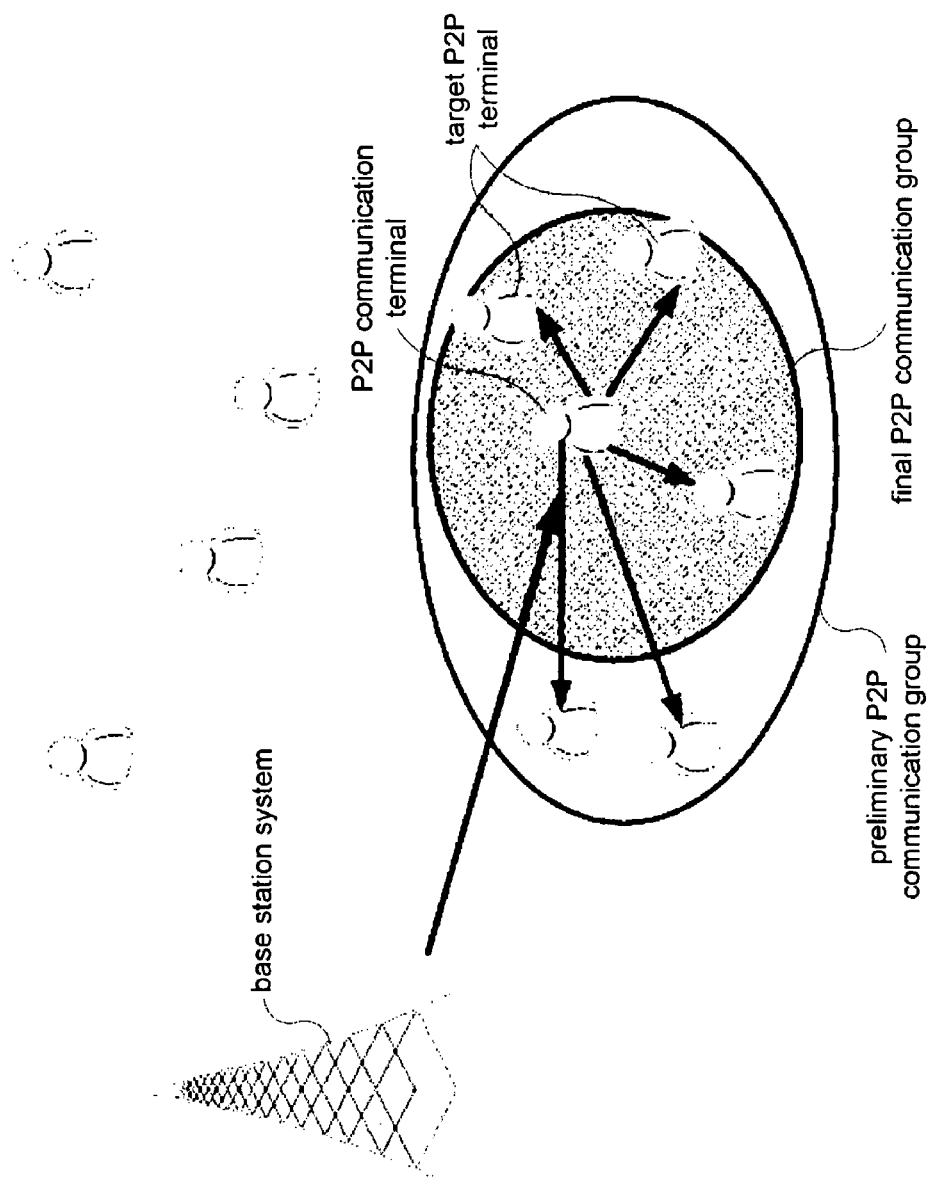
FIG. 4 is a diagram showing a process of setting up a P2P communication group in a cellular system according to an embodiment of the present invention.

FIG. 4 is a diagram showing a process of setting up a P2P communication group in a cellular system according to an embodiment of the invention.

All terminals within a cell managed by a base station send the location information thereof to the base station. The base station sets up a preliminary P2P communication group, selects the P2P communication terminal of the preliminary P2P communication group based on the location information of the terminals, and sends information about the preliminary P2P communication group and information about the P2P communication terminal to the terminals that belong to the preliminary P2P communication group. The P2P communication terminal broadcasts a pilot signal to the target P2P terminals of the corresponding group, receives channel information and service type information, and determines the final P2P communication group.

In the state in which the final P2P communication group has been set, as shown in FIG. 4, when a new terminal enters the communication range of the P2P communication group, or a terminal, belonging to the P2P communication group, exits the communication range, the base station detects the entry and exit of the terminal based on location information, and updates the P2P communication group through communication with the P2P communication terminal. In this case, the control information reception unit of the terminal receives information about a change in the P2P communication group (the entry or exit of a terminal), and the P2P communication management unit of the terminal updates the P2P communication group according to the change in the P2P communication group.

Figure 5:
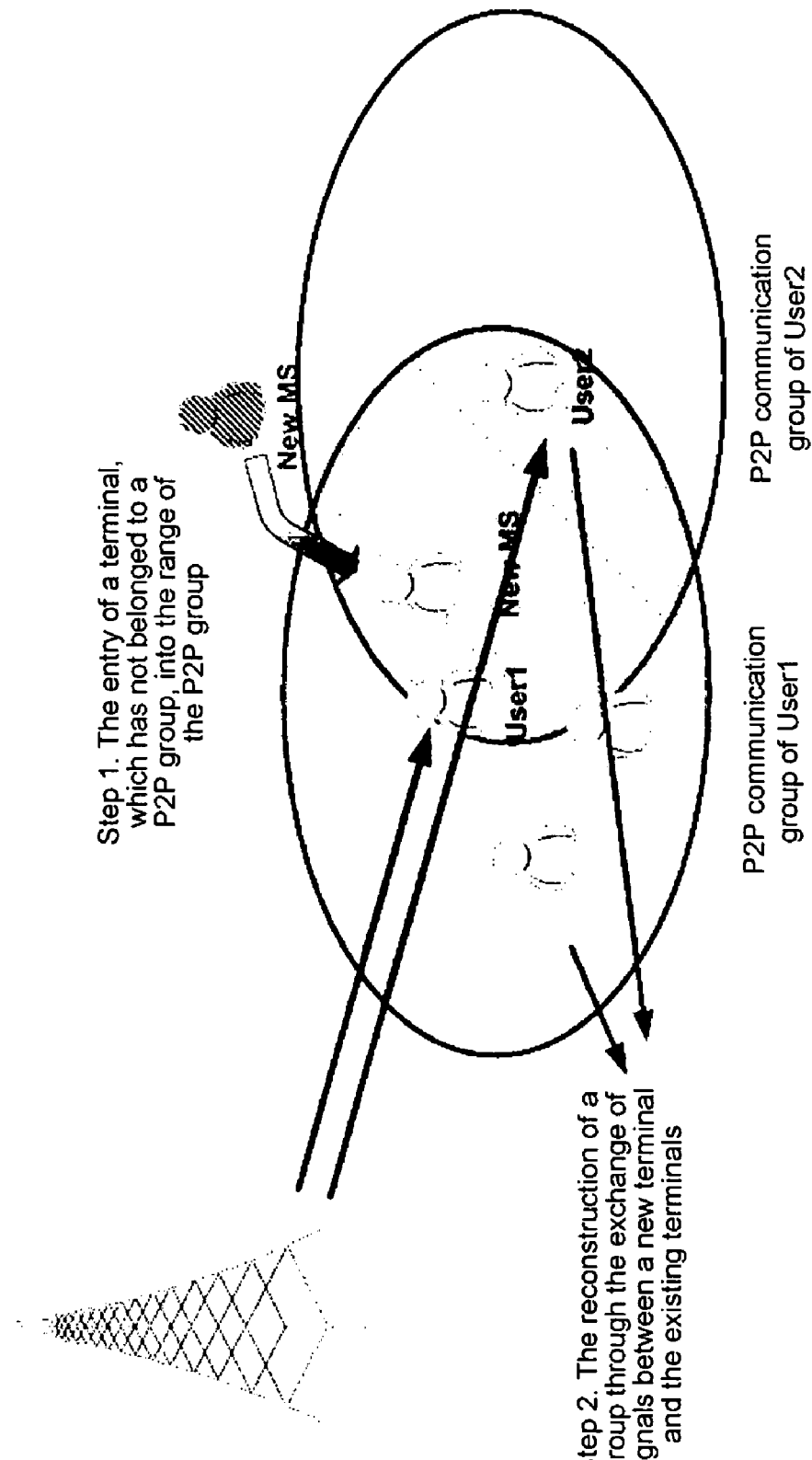
FIG. 5 is a diagram showing a process of updating a P2P communication group when a new terminal enters the P2P communication group in a cellular system according to an embodiment of the present invention.

FIG. 5 is a diagram showing a process of updating a P2P communication group when a new terminal enters the P2P communication group in a cellular system according to an embodiment of the present invention.

When a new terminal New MS enters the range of the P2P communication group (this includes entry through moving of the terminal, and entry through turning on of the terminal), the base station detects the entry based on the location information of the terminals, and notifies the P2P communication terminals User1 and User2 of all P2P communication groups, which the terminal New MS newly enters, of the presence of the newly entering terminal. Then, the P2P communication terminal of each of the P2P communication groups exchange a broadcast pilot signal and a feedback signal with the entering terminal, updates the corresponding P2P communication group, and sends information about the updated P2P communication group to the base station.

Figure 6:
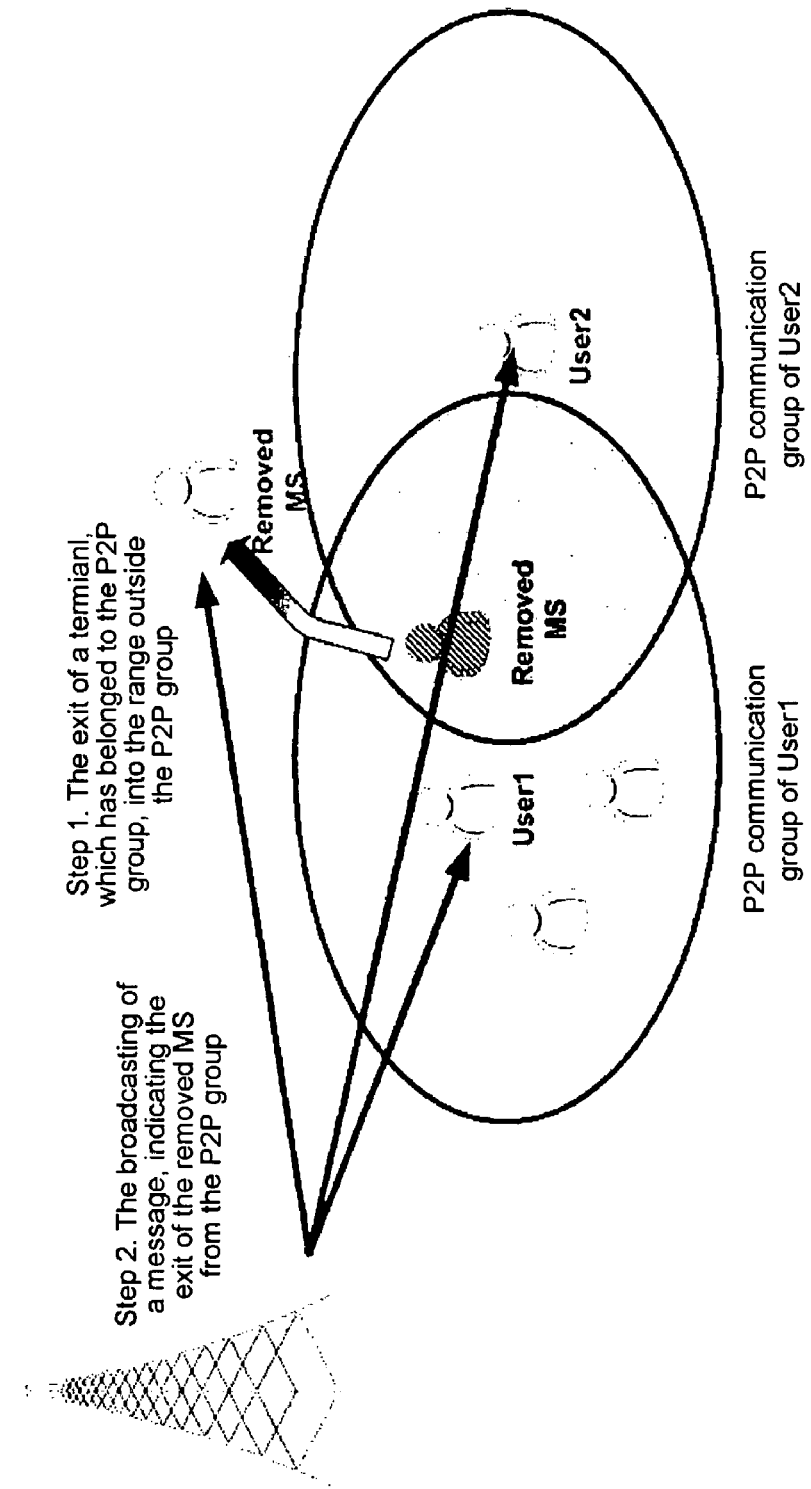
FIG. 6 is a diagram showing a process of updating a P2P communication group when a new terminal exits the P2P communication group in a cellular system according to an embodiment of the present invention.

FIG. 6 is a diagram showing a process of updating a P2P communication group when a new terminal exits the P2P communication group in a cellular system according to an embodiment of the present invention.

When a terminal (Removed MS), belonging to the P2P communication group, exits the P2P communication range (this includes exit attributable to movement of the terminal or exit attributable to turning off of the terminal), the base station detects the exit of the terminal based on the location information of the terminals, and notifies the P2P communication terminals User1 and User2 of all the P2P communication groups which the terminal Removed MS has exited of the presence of the exiting terminal. Then, the P2P communication terminals User1 and User2 of the corresponding P2P communication groups update the P2P communication groups by removing the exiting terminal from the P2P communication groups, and send information about the updated P2P communication groups to the base station.

The above-described update of the P2P communication groups is periodically conducted, and the period of the update is determined such that the overhead of the base station is low, a reduction in the efficiency of P2P communication is minimized, and the service characteristics and average moving speed of each terminal are considered.

Now, the construction of a MAC frame, in which the P2P communication newly proposed in the present invention is considered, is described below.

Generally, a MAC frame includes a control information transmission frame, a downlink frame, and an uplink frame. In the present invention, the MAC frame is constructed by adding a P2P frame to a conventional MAC frame.

Figure 7:
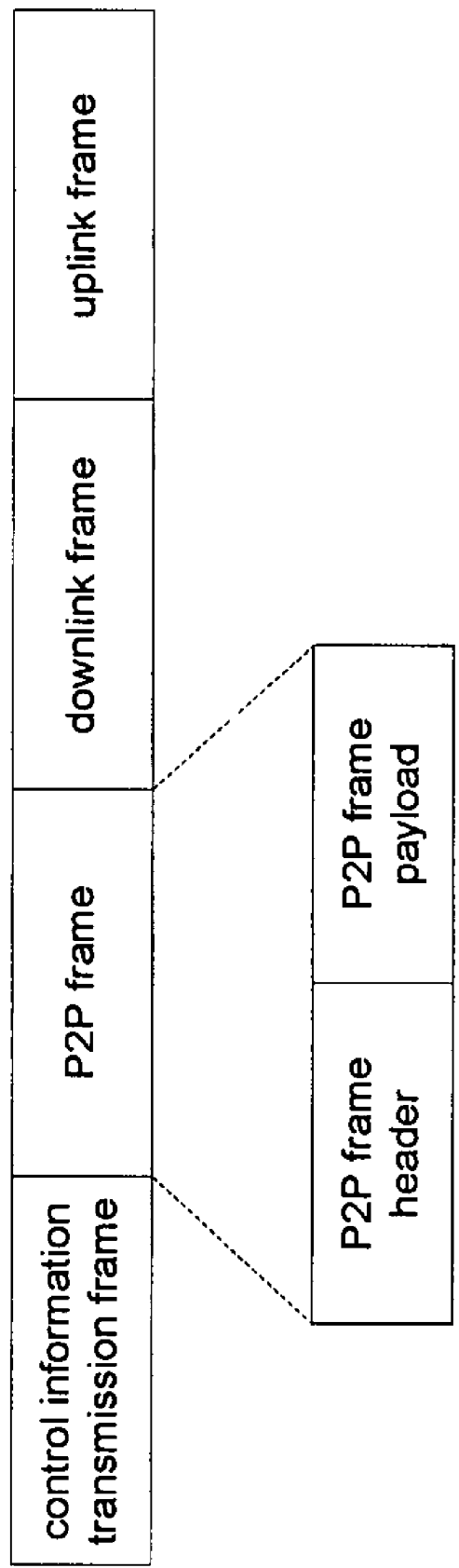
FIG. 7 is a diagram showing the construction of a MAC frame, including a P2P frame, that is proposed by the present invention.

FIG. 7 is a diagram showing the construction of a MAC frame, including a P2P frame, which is proposed by the present invention.

This MAC frame includes a control information transmission frame, a P2P frame, a downlink frame, and an uplink frame. Although, in the present embodiment, the P2P frame is described as being located between the control information transmission frame and the downlink frame, the location and size of the P2P frame are not limited to any specific location or size.

The base station sends information about a preliminary P2P communication group to terminals via such a P2P frame, and also sends information about the entry and exit of a terminal to terminals via such a P2P frame at the time of update of the P2P communication group. The transmission and reception of a broadcast signal and a feedback signal between the terminals is performed via such a P2P frame. Furthermore, P2P communication between terminals is performed in a P2P frame on a contention basis.

The base station sets the size and location of a P2P frame based on the frequency and characteristics of P2P communication within a cell, so that the inference with adjacent cells is minimized and the efficiency of P2P communication is maximized, and notifies all of the terminals within the cell of the size and location of the P2P frame.

Such a P2P frame includes a P2P frame header and a P2P frame payload. The P2P frame header indicates the type of P2P frame payload. There are three types of P2P frame payloads: a preliminary P2P communication group information message type, a final P2P communication group information message type, and an inter-terminal P2P communication type.

The preliminary P2P communication group information message type is used at the time of initial setting of a P2P communication group and update of the P2P communication group. For example, information about a preliminary P2P communication group, set in a base station, and information about a P2P communication terminal and target P2P terminals are included, and an ungrouping message is sent to corresponding terminals at the time of update of the P2P communication group in the case where a terminal exits the P2P communication group.

The final P2P communication group information message type is used at the time of initial setting of a P2P communication group and update of a P2P communication group. For example, it is used when the base station receives the feedback information about a final P2P communication group regarding the preliminary P2P communication group, and when a terminal receives information about the updated P2P communication group at the time of updating the P2P communication group in a situation in which a terminal enters the P2P communication group.

The inter-terminal P2P communication type is used when respective terminals perform P2P transmission on a contention basis.

Figure 8:
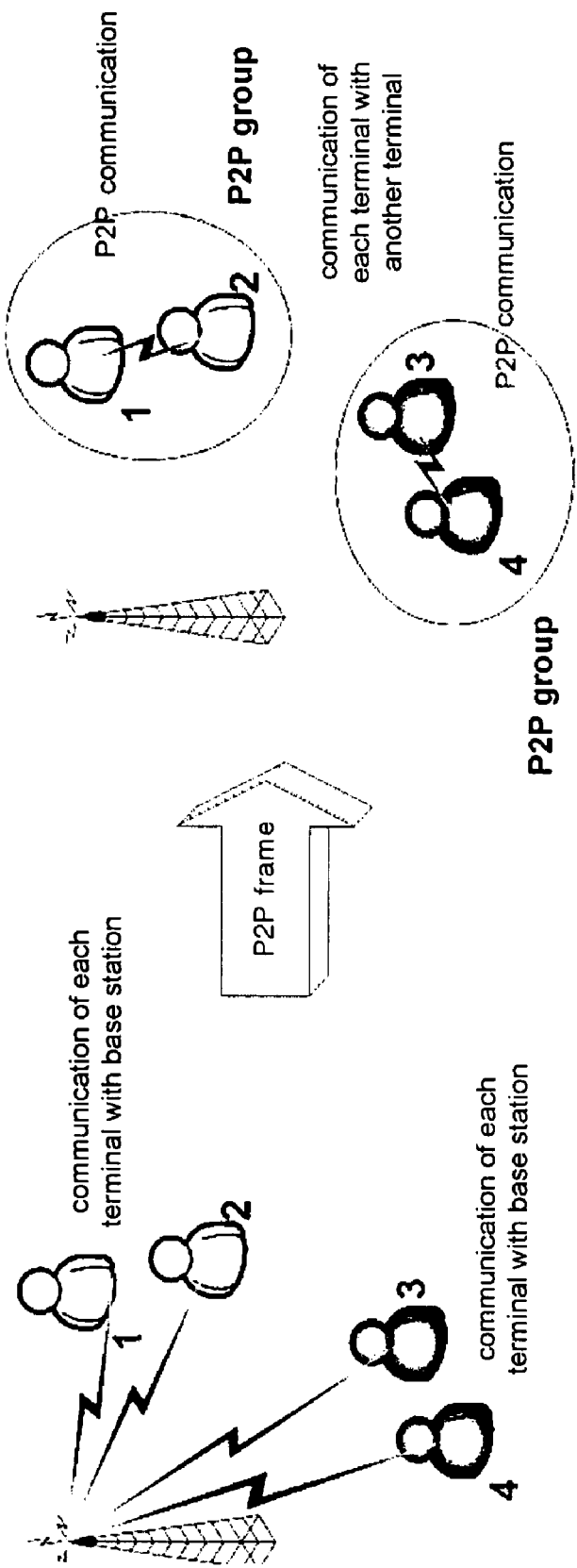
FIG. 8 is a diagram schematically showing a process of P2P communication using a P2P frame.

FIG. 8 is a diagram schematically showing a process of P2P communication using a P2P frame.

Communication between the base station and the terminals is performed in a state in which a P2P frame is vacant in cases other than the cases where a P2P communication group is initially set up or updated.

Meanwhile, the terminals perform P2P communication with each other using a P2P frame without the intervention of a base station.

Since, in the structure of a conventional MAC frame, there is no separate frame capable of carrying data between terminals, resources must be allocated to respective P2P communications of a base station, and must be managed.

In contrast, in the present invention, a P2P frame is proposed, so that respective terminals can perform P2P communication within a P2P frame without the intervention of a base station, with the result that the transmission of P2P packets can be efficiently performed and, at the same time, the overhead of the P2P management of the base station can be reduced.

Furthermore, the base station does not manage the P2P communication group until the final step, but the terminals themselves manage a P2P communication group, so that the overhead of the control of the base station is minimized.

Furthermore, the base station adjusts the size and location of a P2P frame, so that interference with adjacent cells is minimized and the efficiency of P2P communication is maximized.

Furthermore, since the base station does not manage P2P communication, terminals that do not interfere with each other can perform P2P transmission at the same time, so that the capacity of P2P communication can be increased.

The present invention is applicable to the designing of the cellular system which considers the use of P2P communication. And also, the present invention is applicable to the cellular system use of P2P communication. Moreover, the present invention can be used when the cellular system and the ad-hoc system coexist and cooperate.

What is claimed is:

1. A system for setting up a P2P communication group in a cellular system including a base station and terminals, wherein:
 each of the terminals comprises a location detection unit for detecting a location of a terminal, a location information transmission unit for sending information about the location, detected by the location detection unit, to the base station, a control information reception unit for receiving information about a preliminary P2P communication group set up by the base station based on the location information, and a final group setup unit for setting up a final P2P communication group based on the preliminary P2P communication group;
 the final group setup unit comprises a group setup signal transmission unit for sending a broadcast signal to target P2P terminals that belong to the preliminary P2P communication group, a group setup signal reception unit for receiving a feedback signal regarding the broadcast signal from the target P2P terminals, a signal measurement unit for detecting channel information and a service type of the feedback signal, and a P2P communication management unit for setting up a final P2P communication group based on the information about the preliminary P2P communication group and the information obtained by the signal measurement unit; and
 the base station comprises a location information reception unit for receiving location information from the terminals located within a cell, a P2P communication management unit for setting up a preliminary P2P communication group and selecting a P2P communication terminal of the preliminary P2P communication group based on the location information of the terminals, received from the location information reception unit, and a control information transmission unit for sending information about the preliminary P2P communication group and information about the P2P communication terminal to the terminals that belong to the preliminary P2P communication group.

2. A method of setting up a P2P communication group in a cellular system including a base station and terminals, wherein:
 each of the terminals comprises a location detection step of detecting a location of a terminal, a location information transmission step of sending information about the location, detected at the location detection step, to the base station, a control information reception step of receiving information about a preliminary P2P communication group set up by the base station based on the location information, and a final group setup step of setting up a final P2P communication group based on the preliminary P2P communication group;
 the final group setup step comprises a group setup signal transmission step of sending a broadcast signal to target P2P terminals that belong to the preliminary P2P communication group, a group setup signal reception step of receiving a feedback signal regarding the broadcast signal from the target P2P terminals, a signal measurement step of detecting channel information and a service type of the feedback signal, and a P2P communication management step of setting up a final P2P communication group based on the information about the preliminary P2P communication group and the information obtained at the signal measurement step; and
 the base station comprises a location information reception step of receiving location information from the terminals located within a cell, a P2P communication management step of setting up a preliminary P2P communication group and selecting a P2P communication terminal of the preliminary P2P communication group based on the location information of the terminals received at the location information reception step, and a control information transmission step of sending information about the preliminary P2P communication group and information about the P2P communication terminal to the terminals that belong to the preliminary P2P communication group.

3. A P2P communication system using a P2P communication group in a cellular system including a base station and terminals, wherein:
 each of the terminals comprises a location detection unit for detecting a location of a terminal, a location information transmission unit for sending information about the location, detected by the location detection unit, to the base station, a control information reception unit for receiving information about a preliminary P2P communication group and information about a P2P frame for P2P communication from the base station, a final group setup unit for setting up a final P2P communication group based on the preliminary P2P communication group, and a P2P communication unit for performing P2P communication with another terminal that belongs to the final P2P communication group;
 the final group setup unit comprises a group setup signal transmission unit for sending a broadcast signal to target P2P terminals that belong to the preliminary P2P communication group, a group setup signal reception unit for receiving a feedback signal for the broadcast signal from the target P2P terminals, a signal measurement unit for detecting channel information and a service type of the feedback signal, and a P2P communication management unit for setting up a final P2P communication group based on the information about the preliminary P2P communication group and the information obtained by the signal measurement unit; and
 the base station comprises a location information reception unit for receiving location information from terminals located within a cell, a P2P-related information collection unit for collecting information about frequency and characteristics of P2P communication within the cell and in adjacent cells, a P2P communication management unit for setting up a preliminary P2P communication group and selecting a P2P communication terminal of the preliminary P2P communication group based on the location information of the terminals received from the location information reception unit and creating a P2P frame based on the information about the frequency and characteristics of P2P communication received from the P2P-related information collection unit, and a control information transmission unit for sending information about the preliminary P2P communication group, the P2P communication terminal and the P2P frame to the terminals that belong to the preliminary P2P communication group.

4. A P2P communication method using a P2P communication group in a cellular system including a base station and terminals, wherein:

each of the terminals comprises a location detection step of detecting a location of a terminal, a location information transmission step of sending information about the location, detected at the location detection step, to the base station, a control information reception step of receiving information about a preliminary P2P communication group and information about a P2P frame for P2P communication from the base station, a final group setup step of setting up a final P2P communication group based on the preliminary P2P communication group, and a P2P communication step of performing P2P communication with another terminal that belongs to the final P2P communication group;

the final group setup step comprises a group setup signal transmission step of sending a broadcast signal to target P2P terminals that belong to the preliminary P2P communication group, a group setup signal reception step of receiving a feedback signal for the broadcast signal from the target P2P terminals, a signal measurement step of detecting channel information and a service type of the feedback signal, and a P2P communication management step of setting up a final P2P communication group based on the information about the preliminary P2P communication group and the information obtained at the signal measurement step; and the base station comprises a location information reception step of receiving location information from terminals located within a cell, a P2P-related information collection step of collecting information about frequency and characteristics of P2P communication within the cell and in adjacent cells, a P2P communication management step of setting up a preliminary P2P communication group and selecting a P2P communication terminal of the preliminary P2P communication group based on the location information of the terminals received at the location information reception step, and creating a P2P frame based on the information about the frequency and characteristics of P2P communication received at the P2P-related information collection step, and a control information transmission step of sending information about the preliminary P2P communication group, the P2P communication terminal and the P2P frame to the terminals that belong to the preliminary P2P communication group.

* * * * *